United States Patent [19]

Abraham et al.

[11] Patent Number: 5,539,906

[45] Date of Patent: *Jul. 23, 1996

[54] METHOD AND APPARATUS FOR CONTROLLING ACCESS TO DATA ELEMENTS IN A DATA PROCESSING SYSTEM BASED ON STATUS OF AN INDUSTRIAL PROCESS

[75] Inventors: Robert L. Abraham, Marietta; Herman Mitchell, Lithonia; Badari N. Panuganti, Mableton; Laura A. Stowers, Smyrna, all of Ga.

[73] Assignee: International Business Machines Corporation, Armonk, N.Y.

[*] Notice: The term of this patent shall not extend beyond the expiration date of Pat. No. 5,446,903.

[21] Appl. No.: 449,412

[22] Filed: May 24, 1995

Related U.S. Application Data

[63] Continuation of Ser. No. 57,527, May 4, 1993, Pat. No. 5,446,903.

[51] Int. Cl.⁶ .................................................. G06F 17/30
[52] U.S. Cl. ........................... 395/600; 364/DIG. 1; 364/246.6; 364/246.8
[58] Field of Search ........................... 395/600, 726, 395/728; 364/468

[56] References Cited

U.S. PATENT DOCUMENTS

| | | | |
|---|---|---|---|
| 4,525,780 | 6/1985 | Bratt et al. | 364/200 |
| 4,698,752 | 10/1987 | Goldstein et al. | 364/200 |
| 4,713,753 | 12/1987 | Boebert et al. | 364/200 |
| 4,807,108 | 2/1989 | Ben-Arieh et al. | 364/148 |
| 5,008,853 | 4/1991 | Bly et al. | 364/900 |
| 5,089,970 | 2/1992 | Lee et al. | 364/468 |
| 5,133,075 | 7/1992 | Risch | 395/800 |
| 5,151,987 | 9/1992 | Abraham et al. | 395/575 |
| 5,161,223 | 11/1992 | Abraham | 395/600 |
| 5,161,225 | 11/1992 | Abraham et al. | 395/600 |
| 5,191,534 | 3/1993 | Orr et al. | 364/468 |
| 5,208,765 | 5/1993 | Turnbull | 364/552 |
| 5,317,729 | 5/1994 | Mukherjee et al. | 395/600 |
| 5,379,423 | 1/1995 | Mutoh et al. | 395/600 |
| 5,446,903 | 8/1995 | Abraham et al. | 395/728 |

OTHER PUBLICATIONS

Robinson et al., *Domain–Based Access Control for Distributed Computing Systems*, Software Engineering Journal, Sep. 1988, pp. 161–170.

Shimizu et al., *Hierarchical Object Groups in Distributed Operating Systems*, IEEE, 1988, pp. 18–24.

Vinter, *Extended Discretionary Access Controls*, IEEE, 1988, pp. 39–49.

*Primary Examiner*—Thomas G. Black
*Assistant Examiner*—John C. Loomis
*Attorney, Agent, or Firm*—Bell, Seltzer, Park & Gibson

[57] ABSTRACT

The security of data elements which represent an industrial process, which are manipulated by users on a data processing system and in which the industrial process includes a series of industrial process steps, are controlled by permitting groups of users to access predetermined data elements based on the industrial process step at which the industrial process is currently active. A user is prevented from accessing the requested element if the industrial process is not at an industrial process step corresponding to one of the industrial process steps for which the user has authority to access the data element. Thus, access to data is prevented based on the status of the data, in addition to the type of data. When selected database elements are associated with one of many locations, access is also denied to a user based on the location. Security access based on status and location may be provided in response to a change in the current industrial process step. Access authority to the data elements is changed compared to the access authority at the immediately preceding industrial process step based on mappings in one or more tables. Improved security of data elements which represent an industrial process is thereby provided.

16 Claims, 17 Drawing Sheets

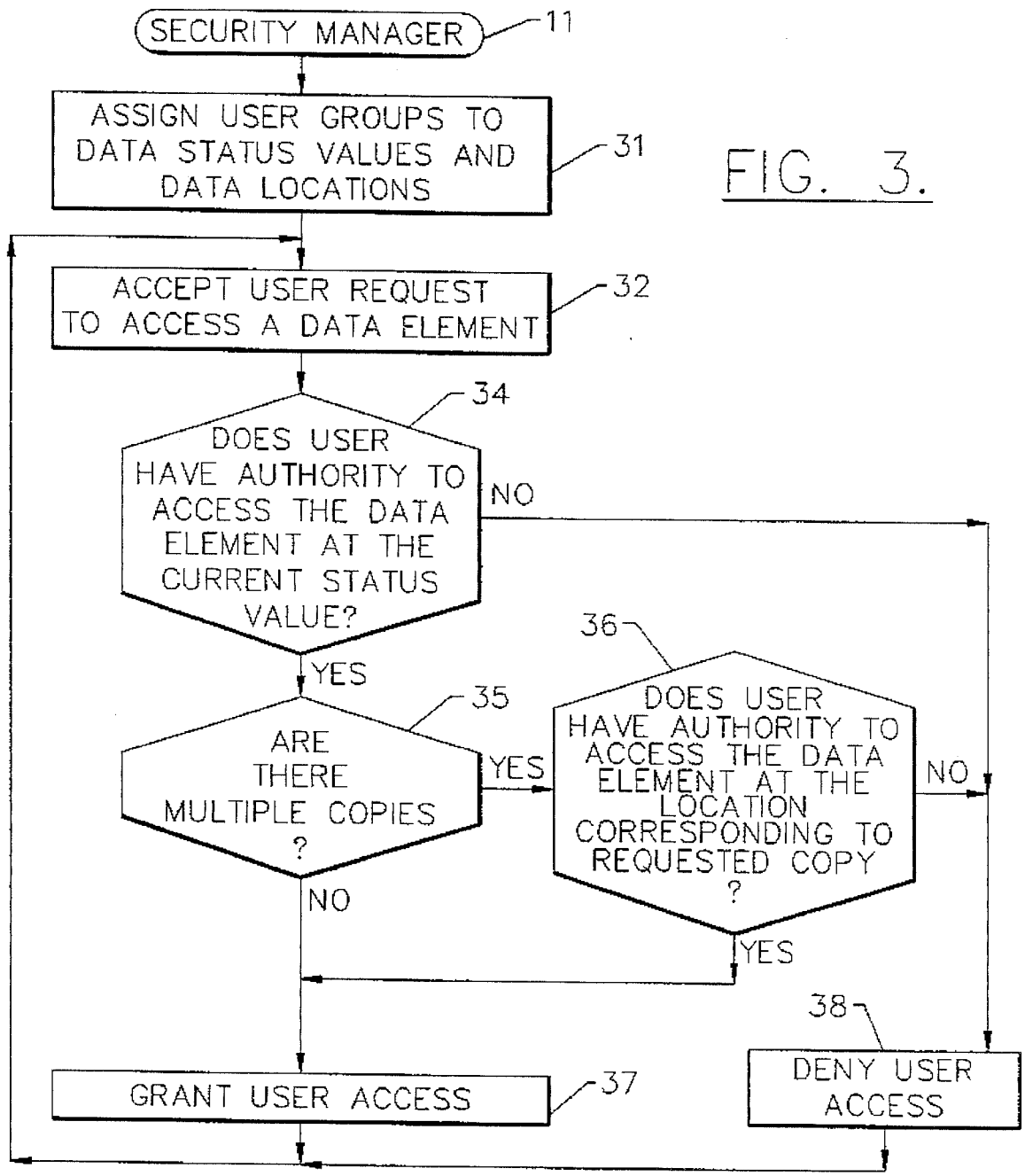

| WHEN STATUS OF AN OBJECT CHANGES TO THIS STATUS | AND ITS OLD SECURITY CATEGORY IS THIS VALUE | THEN CHANGE THE SECURITY CATEGORY TO THIS NEW VALUE /12 |
|---|---|---|
| STATUS2<br>STATUS3<br>STATUS4<br>STATUS5 | SECCAT01<br>SECCAT02<br>SECCAT03<br>SECCAT04 | SECCAT02<br>SECCAT03<br>SECCAT04<br>SECCAT05 |

FIG. 4.

| USERS | HAVE ACCESS TO CATEGORY | CORRESPONDING STATUS TO THIS CATEGORY |
|---|---|---|
| U1,U2,U3,U4<br>U3,U4,U5,U6<br>U8,U9<br>----------<br>---------- | SECCAT01<br>SECCAT02<br>SECCAT03<br>----------<br>---------- | STATUS1<br>STATUS2<br>STATUS3 |

FIG. 5.

| WHEN STATUS OF AN OBJECT CHANGES TO THIS STATUS | AND ITS OLD SECURITY CATEGORY IS THIS VALUE | THEN CHANGE THE SECURITY CATEGORY TO THIS NEW VALUE |
|---|---|---|
| STATUS2 | TURB01 | TURB02 |
| STATUS2 | CARB01 | CARB02 |
| STATUS3 | TURB02 | TURB03 |
| STATUS3 | CARB02 | CARB03 |
| STATUS4 | TURB03 | TURB04 |
| STATUS4 | CARB03 | CARB04 |
| STATUS5 | TURB04 | TURB05 |
| STATUS5 | CARB04 | CARB05 |

FIG. 6.

| FROM LOC | TO LOC | TARGET STATUS | FROM CATEGORY | TO CATEGORY |
|---|---|---|---|---|
| LOC1 | LOC1 | STATUS2 | SECCAT01 | SECCAT02 |
| LOC1 | LOC2 | STATUS3 | SECCAT02 | SECCAT12 |
| LOC1 | LOC3 | STATUS3 | SECCAT02 | SECCAT13 |
| LOC1 | LOC4 | STATUS3 | SECCAT02 | SECCAT14 |
| LOC2 | LOC2 | STATUS4 | SECCAT12 | SECCAT22 |
| LOC2 | LOC2 | STATUS5 | SECCAT22 | SECCAT23 |

FIG. 7.

| CLASS ID | DESCRIPTION | TARGET STATUS | "FROM" CATEGORY | "TO" CATEGORY | "FROM" LOCATION | "TO" LOCATION |
|---|---|---|---|---|---|---|
| | | | | | | |

```
 File  Edit  View  Help
┌ EUOET100 ─────── EC Security Category Mappings List ───────────
│                                              More Panel:      >
│ Class ID . . . . . :  EC
│ Class name . . . . :  ENGINEERING_CHANGE
│
│                                              More List:       >
│  Target Status    From Category      To Category     Description
│
│  PRE_RELEASE     SEC_CATEG_DEV1    SEC_CATEG_PRE1   Restrict to Grp 1..
│  PRE_RELEASE     SEC_CATEG_DEV2    SEC_CATEG_PRE2   Restrict to Grp 2..
│  RELEASE         SEC_CATEG_PRE1    SEC_CATEG_REL    Open to All Engin..
│  RELEASE         SEC_CATEG_PRE2    SEC_CATEG_REL    Open to All Engin..
│
│
 F1=Help  F2=Set 2  F3=Exit  F5=Refresh  F6=Switch  F10=Actions  F11=Fastpath
 F12=Cancel
```

FIG. 9C.

```
File  Edit  View  Help
┌─ EUOET100 ─────── EC Security Category Mappings List ───────────────
│                                                           More Panel: ^
│  Class ID . . . . . . :  EC
│  Class name . . . . . :  ENGINEERING_CHANGE
│
│                                                           More List:      ^
│  Target Status      From Category      To Category        Description
│  PRE_RELEASE        SEC_CATEG_DEV1     SEC_CATEG_PRE1     Restrict to Grp 1...
│o_ PRE_RELEASE       SEC_CATEG_DEV2     SEC_CATEG_PRE2     Restrict to Grp 2...
│__ RELEASE           SEC_CATEG_PRE1     SEC_CATEG_REL      Open to All Engin...
│__ RELEASE           SEC_CATEG_PRE2     SEC_CATEG_REL      Open to All Engin...
│
│ ─ EUOEE100 ─────── EC Security Category Mappings (New) ──────────────
│                                                           More Panel:
│  Class ID . . . . . . . . . . . . . . :  EC
│  Target status . . . . . . . . . . . . .  PRE_RELEASE
│  From category  . . . . . . . . . . . . . SEC_CATEG_DEV2            +
│  To category  . . . . . . . . . . . . . . SEC_CATEG_PRE2            +
│  Description  . . . . . . . . . . . . . . Restrict to Grp 2 Designers
│
└────────────────────────────────────────────────────────────────────
F1=Help  F2=Set 2  F3=Exit  F4=Prompt  F6=Switch  F10=Actions  F11=Fastpath
F12=Cancel
```

FIG. 10B.

```
 File   Edit   View   Help
┌─ EUOST100 - Affected Item Security Category Mappings List ──────────────┐
│                                                    More Panel:    +  > │
│ Class ID . . . . . :  AI                                                │
│ Class name . . . . :  ITEM                                              │
│                                                    More List:        > │
│             From Location  To Location                                  │
│ Target Status    ID            ID       From Category    To Category    │
│                                                                         │
│ _ RELEASE     ENG_LOC1     ENG_LOC1     SEC_CATEG_PRE1   SEC_CATEG_REL  │
│ _ ACCEPT      ENG_LOC1     MFG_LOC1     SEC_CATEG_REL    SEC_CATEG_AC1  │
│ _ ACCEPT      ENG_LOC1     MFG_LOC2     SEC_CATEG_REL    SEC_CATEG_AC2  │
│ _ EFFECTIVE   MFG_LOC1     MFG_LOC1     SEC_CATEG_AC1    SEC_CATEG_EFF  │
│ _ EFFECTIVE   MFG_LOC2     MFG_LOC2     SEC_CATEG_AC2    SEC_CATEG_EFF  │
│                                                                         │
│ F1=Help  F2=Set 2  F3=Exit  F10=Actions  F11=Fastpath  F12=Cancel       │
└─────────────────────────────────────────────────────────────────────────┘
```

FIG. 10C.

```
 File  Edit  View  Help
┌─ EUOST100 ─────── Item Security Category Mappings List ──────────────────┐
│                                                        More Panel:  + >  │
│                                                                          │
│  Class ID . . . . . :  AI                                                │
│  Class name . . . . :  ITEM                                              │
│                                                                          │
│                       From Location   To Location                        │
│  Target Status            ID              ID       From Category   To Category
│                                                                    >     │
│                                                        More List:        │
│ ┌─ EUOSE100 ─────── Item Security Category Mappings (New) ──────────────┐│
│ │                                                       More Panel:  >  ││
│ │                                                                       ││
│ │  Class ID . . . . . . . . . . . . . :  ITEM                           ││
│ │  Target status  . . . . . . . . . . :  ACCEPT                         ││
│ │  From location ID . . . . . . . . . :  ENG_LOC1                       ││
│ │  To location ID . . . . . . . . . . :  MFG_LOC2                       ││
│ │  From category  . . . . . . . . . . :  SEC_CATEG_REL              +   ││
│ │  To category  . . . . . . . . . . . :  SEC_CATEG_AC2              +   ││
│ │  Description  . . . . . . . . . . . :  Accepted at Plant #2           ││
│ │                                                                       ││
└──────────────────────────────────────────────────────────────────────────┘

F1=Help  F2=Set 2  F3=Exit  F4=Prompt  F6=Switch  F10=Actions  F11=Fastpath
 F12=Cancel                                                              ns
```

```
+----------------+------------------+---------------------------------+
| Table 1        | Table 2          | Table 3                         |
| Security Levels| Security Categories | Security Groups & Users in Groups |
|----------------|------------------|---------------------------------|
| Security Level | Security Category| SECURITY GROUP      USERS       |
|----------------|------------------|---------------------------------|
| SEC_LEVEL1     | SEC_CATEG_PRE1   | SEC_GROUP_ENGINEER  USER_ENG1   |
| SEC_LEVEL2     | SEC_CATEG_REL    | SEC_GROUP_ENGINEER  USER_ENG2   |
| SEC_LEVEL3     | SEC_CATEG_ACC1   | SEC_GROUP_MANUFACT  USER_ENG1   |
| SEC_LEVEL4     | SEC_CATEG_EFF    | SEC_GROUP_MANUFACT  USER_MFG1   |
|  . . .         |  . . .           |  . . .                          |
+----------------+------------------+---------------------------------+
```

```
+---------------------------------------------------------------------+
|                          Table 4                                    |
|           Objects, their methods and whether they are secured       |
| OBJECT_GROUP        METHOD              METHOD SECURED?             |
|---------------------------------------                              |
| EC_PANEL            OPEN                NO                          |
| EC                  AUTH_DISPLAY        YES                         |
| EC                  AUTH_CHANGE         YES                         |
| EC                  AUTH_PROMOTE_REL    YES                         |
+---------------------------------------------------------------------+
```

```
+---------------------------------------------------------------------+
|                   Table 5—Security Access Table                     |
|              Security Groups & their Authorization                  |
| SECURITY_GROUP        OBJECT  AT SEC LEVEL  AT SEC CATEGORY  METHOD |
|---------------------------------------------------------------------|
| SEC_GROUP_ENGINEER    EC      SEC_LEVEL4    SEC_CATEG_PRE1   AUTH_CHANGE       |
| SEC_GROUP_ENGINEER    EC      SEC_LEVEL4    SEC_CATEG_PRE1   AUTH_DISPLAY      |
| SEC_GROUP_ENGINEER    EC      SEC_LEVEL4    SEC_CATEG_PRE1   AUTH_PROMOTE_REL  |
| SEC_GROUP_ENGINEER    EC      SEC_LEVEL4    SEC_CATEG_REL    AUTH_CHANGE       |
| SEC_GROUP_ENGINEER    EC      SEC_LEVEL4    SEC_CATEG_REL    AUTH_DISPLAY      |
| SEC_GROUP_MANUFACT    EC      SEC_LEVEL4    SEC_CATEG_REL    AUTH_DISPLAY      |
| SEC_GROUP_ENGINEER    AI      SEC_LEVEL4    SEC_CATEG_PRE1   AUTH_CHANGE       |
| SEC_GROUP_ENGINEER    AI      SEC_LEVEL4    SEC_CATEG_PRE1   AUTH_DISPLAY      |
| SEC_GROUP_ENGINEER    AI      SEC_LEVEL4    SEC_CATEG_PRE1   AUTH_PROMOTE_REL  |
| SEC_GROUP_ENGINEER    AI      SEC_LEVEL4    SEC_CATEG_REL    AUTH_CHANGE       |
| SEC_GROUP_ENGINEER    AI      SEC_LEVEL4    SEC_CATEG_REL    AUTH_DISPLAY      |
| SEC_GROUP_MANUFACT    AI      SEC_LEVEL4    SEC_CATEG_REL    AUTH_DISPLAY      |
|  . . .                                                              |
+---------------------------------------------------------------------+
```

```
+---------------------------------------------------------------------+
|                 Table 6 —Security Category Mapping Table            |
|   States and Corresponding mapping to Security Category             |
| OBJECT  TARGET   FROM SECURITY   TO SECURITY    FROM        TO      |
|         STATUS   CATEGORY        CATEGORY       LOCATION    LOCATION|
|---------------------------------------------------------------------|
| EC      RELEASE  SEC_CATEG_PRE1  SEC_CATEG_REL                      |
| EC      RELEASE  SEC_CATEG_PRE2  SEC_CATEG_REL                      |
| AI      RELEASE  SEC_CATEG_PRE1  SEC_CATEG_REL   ENG_LOC1   ENG_LOC1|
| AI      RELEASE  SEC_CATEG_PRE2  SEC_CATEG_REL   ENG_LOC1   ENG_LOC1|
+---------------------------------------------------------------------+
```

FIG. 11.

METHOD AND APPARATUS FOR CONTROLLING ACCESS TO DATA ELEMENTS IN A DATA PROCESSING SYSTEM BASED ON STATUS OF AN INDUSTRIAL PROCESS

This application is a continuation of application Ser. No. 08/057,527, filed May 4, 1993, now U.S. Pat. No. 5,446,903.

FIELD OF THE INVENTION

This invention relates to data processing systems and methods and more particularly to systems and methods for controlling data security in a data processing system.

BACKGROUND OF THE INVENTION

Data processing systems are widely used to control industrial processes which move through a series of industrial process steps. An example of an industrial process which is controlled by a data processing system is a computer controlled design and manufacturing system. In a computer controlled design and manufacturing system, often referred to as a computer automated design/computer aided manufacturing (CAD/CAM) system, items are designed on a computer, and the system for manufacturing the designed item is controlled by computers.

In a CAD/CAM system the design of an item progresses through a series of steps, with the design of the item being represented on a computer database during all steps. Thus, for example, the design progresses from a development phase, to a pre-release phase, a release phase, and an accept phase. During the development phase, the design is typically developed and tested for implementation worthiness by test and development engineers. During the pre-release phase, the developed design is approved by various organizations until authority has been given to finalize the design. During the release phase, the design has been reviewed by appropriate authorities and is released for manufacturing.

An item is typically designed at one development location and is manufactured at multiple locations. Accordingly, during the accept phase, the design is accepted into a manufacturing location and manufacturing planners and engineers prepare the design so that it can be implemented in the shop floor at that location. The design then moves to an effective phase where the design has been approved by the manufacturing engineers and is ready to be implemented in the shop floor at a prescribed implementation date. Finally, the design is eventually phased out by placing it in a closed status. In a CAD/CAM system, the design of the item is developed, modified and then implemented for manufacturing on a computer platform rather than using traditional printed engineering blueprints and printed specifications.

After an item is designed and manufactured, an engineering change control process is also typically controlled by a data processing system. As is well known to those having skill in the art, an engineering change represents a change to the design of an item in a manufacturing environment. Similar to the design and manufacturing process for the item itself, an engineering change typically progresses through a series of industrial process steps including development, pre-release, release, accept, effective and closed. CAD/CAM systems typically represent engineering change control data and are used to control the engineering change control process. See for example U.S. Pat. No. 5,191,534 to Orr et al. entitled *Engineering and Manufacturing Change Control Mechanism*, which is assigned to the assignee of the present invention, the disclosure of which is incorporated herein by reference.

Industrial processes which are controlled by data processing systems are not limited to manufacturing processes. For example, in preparing a document for publication, the document itself typically undergoes phases of development, pre-release, release, accept, effective and closed along the lines described above. Similar steps are also involved in most business processes such as a business proposal or bid process or a budgeting process.

When using a data processing system to control industrial processes of the types described above, it is particularly important to protect the data security of the data processing system. The industrial process is typically represented by a large number of data elements in a database on the data processing system, and multiple users from multiple groups have access to the data. Since the data is ultimately used to design an item, such as a product, a document, or a budget, it is important that the data is not corrupted by the large numbers of people who have access to the data.

Many security control systems for data processing systems which share data have been proposed. See, for example, U.S. Pat. No. 4,525,780 to Bratt et al. entitled *Data Processing Systems Having a Memory Using Object-Based Information and a Protection Scheme for Determining Access Rights to Such Information*; U.S. Pat. No. 4,698,752 to Goldstein et al. entitled *Data Base Locking*; U.S. Pat. No. 4,713,753 to Boebert et al. entitled *Secure Data Processing System Architecture with Format Control*; U.S. Pat. No. 5,008,853 to Bly et al. entitled *Representation of Collaborative Multi-User Activities Relative to Shared Structure Data Objects in a Networked Workstate Environment*; and U.S. Pat. No. 5,133,075 to Risch entitled *Method of Monitoring Changes in Attribute Values of Object in an Object-Oriented Database*.

Notwithstanding this intense focus, there is a continuing need for a method and system for controlling security of data elements which represent an industrial process and which are manipulated by a plurality of users on a data processing system. There is a particular need for controlling security when the industrial process includes many industrial process steps which are practiced over an extended time period.

SUMMARY OF THE INVENTION

It is therefore an object of the present invention to provide an improved data security control method and system for a data processing system.

It is another object of the present invention to provide a method and system for controlling security of data elements which represent an industrial process and which are manipulated by a plurality of users on a data processing system.

It is yet another object of the invention to provide a method and system for controlling security of data elements which represent an industrial process including a plurality of industrial process steps which are practiced over an extended time period.

It is still another object of the present invention to provide a method and apparatus for controlling security of data elements which represent an industrial process, the early steps of which are practiced at a single location and the later steps of which are practiced in parallel at multiple locations.

These and other objects are provided, according to the present invention, by a method and apparatus for controlling security of data elements which represent an industrial process, which are manipulated by a plurality of users on a data processing system, and in which the industrial process includes a series of industrial process steps, by assigning predetermined groups of users to access predetermined groups of the data elements based upon the industrial process step at which the industrial process is currently active. A user is prevented from accessing a requested data element if the industrial process is not at an industrial process step corresponding to one of the industrial process steps for which the user has been assigned authority to access the data element. Thus, access to data is prevented based on the status of the data, in addition to the category or type of data. Users may have access to data elements at some steps in an industrial process, but will be denied access to these data elements at other steps in the industrial process. Improved security of data elements which represent an industrial process is thereby provided.

According to another aspect of the invention, the user groups which access the data are located at a plurality of locations, and a copy of selected database elements is associated with each location. In this situation, access will be denied to a user based on the status of the data, i.e. the current industrial step, and the location of the user. Thus, for example, a manufacturing engineer at a particular location can only access a copy of the design data which is associated with that particular location.

It will be understood by those having skill in the art that the present invention can be used with other conventional security access techniques. Thus, for example, the system and method for controlling security based on data status and location may be used in addition to password control, security level control (such as "internal use only", "confidential" and "restricted" classifications), and other classifications based on groups of users (such as manufacturing engineers only or management only) or type of data (such as customer number or contract number). However, by granting access to database elements based upon the current industrial process step, additional security protection is provided when data progresses through a series of industrial process steps.

It will also be understood by those having skill in the art that the present invention will typically grant varying degrees of access such as display only, display and update, or no access. Accordingly, it will be understood by those having skill in the art that access is typically not an all or nothing state, but rather different degrees of access will be granted or denied according to the present invention.

An embodiment of the present invention includes a security table which executes on the data processing system and which maps users to corresponding categories of data elements and corresponding industrial process steps. It will be understood by those having skill in the art that the mapping may be direct, using a single security table, or indirect wherein the security table comprises a plurality of tables which together control security based on status. A system operator maps particular users to particular categories of data elements and corresponding industrial process steps for which access is authorized. Mapping may also take place as to the particular location which is associated with a copy of selected database elements. Multiple mappings are typically present between users, data categories and industrial process steps. Thus for example, a single user can typically access multiple categories of data at multiple industrial process steps. Stated another way, many users can typically access the same data at the same industrial process steps. In response to a change in the current industrial process step, which may be indicated by a system administrator, a user or by the industrial process itself, access authority to the data elements is changed, compared to the access authority at the immediately preceding industrial process step, based on the mapping.

A particular implementation of the present invention uses a first table, also referred to as a security access table, which maps user groups to corresponding categories of data elements and corresponding security categories. The first table is used for granting or denying a requested action by a user on a specified data element based on its current security category. A second table, also referred to as a security category mapping table, maps the industrial process steps to at least one old security category and to a corresponding at least one new security category, and optionally to at least one old location and a corresponding at least one new location. Thus, this mapping changes category and location upon progression of the industrial process from an old step to a new step. In response to operator input, user groups corresponding categories of data elements, industrial process steps, corresponding old and new security categories and corresponding old and new locations are entered into the first and second tables.

Upon receiving an indication that the industrial process has progressed from a first industrial process step to a second industrial process step, the old security categories and new security categories corresponding to the second industrial process step are identified and the occurrences of security categories corresponding to the old security categories in the first table are identified. The identified old security categories in each data element's security category attribute, are replaced with the corresponding new security category from the second table. Access is then prevented using the replaced security category attribute of the data element. Thus, the users remain authorized to the same data categories, but the current security category of the data elements may be changed in response to the progression of the industrial process.

Accordingly, this implementation uses existing security categories to provide a vehicle for mapping old and new industrial process steps and old and new locations. Security is granted or denied based on the security category found in the security access table. Progression from an old to a new process step is used to change a security category. Thus, only the security category of the data element need be accessed in order to determine whether to grant or deny access to a user.

The present invention is particularly suited for object oriented database management systems. As is well known to those having skill in the art, object oriented database management systems typically include large databases and may be capable of multitasking. Accordingly, data security is particularly important. In an object oriented implementation, a new object family is created to define the security category mapping and new methods are created to change the security category based on new status and to change the security category based on new location and new status.

BRIEF DESCRIPTION OF THE DRAWINGS

FIG. 3 illustrates operation of a security manager according to the invention.

FIGS. 4–8 illustrate embodiments of a security table according to the present invention.

FIGS. 9A–9C illustrate a first embodiment of panels used by a security administrator for defining and maintaining security mapping definitions according to the present invention.

FIGS. 10A–10C illustrate a second embodiment of panels used by a security administrator for defining and maintaining security mapping definitions according to the present invention.

FIG. 11 illustrates another embodiment of a security table according to the present invention.

DETAILED DESCRIPTION OF PREFERRED EMBODIMENTS

Figure 1:
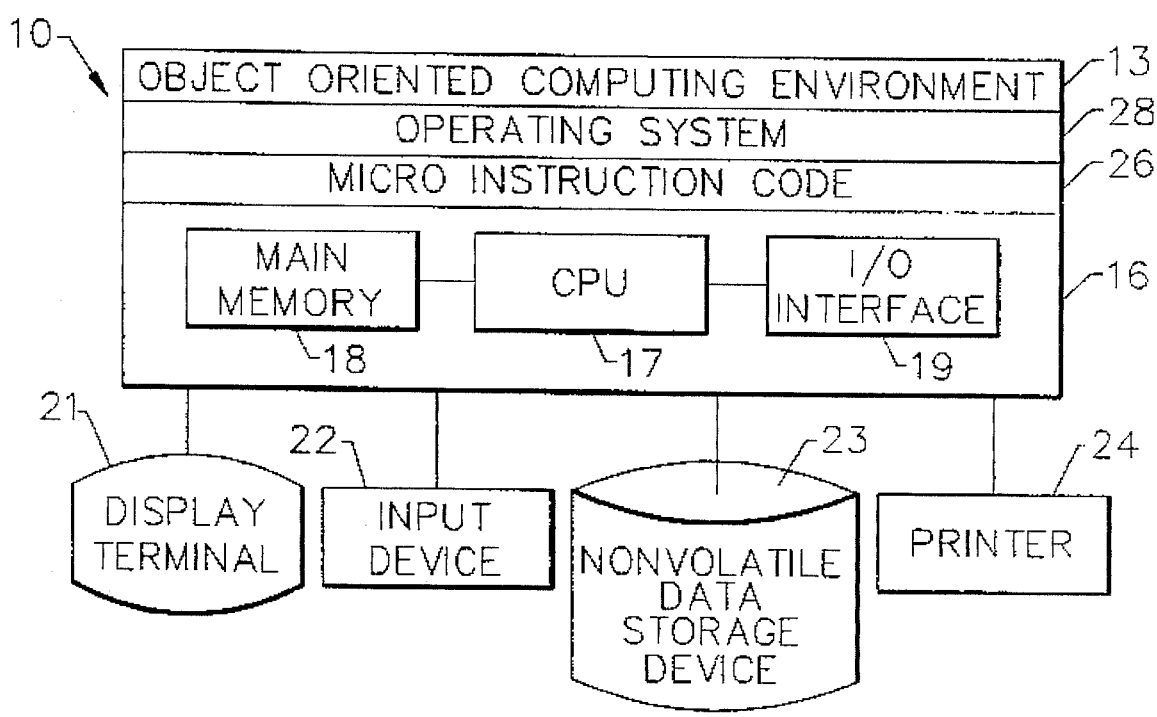
FIG. 1 illustrates a block diagram of a data processing system on which the present invention may be practiced.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention will be described within the context of a security control method and system for data representing engineering changes. However, it will be understood by those having skill in the art that the invention may be used for security control of data elements which represent any industrial process which includes a plurality of industrial process steps. The description will begin with a general description of the engineering change control process, a hardware environment for the invention, a general overview of a method and system according to the present invention, and a detailed implementation for an object oriented computing environment. A specific example will then be described in detail.

Engineering Change Control

As is well known to those having skill in the art, an engineering change is a design change for a product in a manufacturing environment. An engineering change is associated with a list of items or parts so that the design of those items can be changed using the authority of the engineering change. It will be understood that an item represents a part developed or used by an enterprise. The part can be a mechanical part, a chemical compound, a document, or any other known component. Typically, an engineering change will affect more than one item. The items which are affected by an engineering change are referred to as "affected items".

As is also well known to those having skill in the art, the engineering change progresses through a series of steps. The current step in the series is referred to as its "status". Accordingly, status represents a progression of industrial process steps, such as an engineering change progression for a design to change an item. At any point in the engineering change process, the status will have a particular value.

Typical engineering change status progression for an item begins with "development" in which the engineering change is tested, using a simulation or an actual prototype, for implementation worthiness. During the development phase, it is desirable only to allow test and development engineers to have display and update access to the particular engineering change data. Other groups may have display only access, and yet other groups may have no access at all.

After leaving the development status, the engineering change enters "pre-release" status. In this status, the engineering change has been approved for incorporation into the product and a corresponding authority has been given in the form of an engineering change. During the pre-release status, design engineers typically have display and update access to the engineering change and nobody else has display and update access to the engineering change. Other groups may have display only access and yet other groups may have no access at all.

After pre-release, the engineering change enters "release" status. The design change has been reviewed by appropriate authorities and is released for further processing. During this status, other organizations such as Manufacturing Planning and Material Procurement typically have display and update access to the design change. Other groups may have display only access and yet other groups may have no access at all.

The engineering change then enters the "accept" status. At this status, the engineering change has been accepted into a manufacturing location and the manufacturing planners prepare the engineering change so that it can be implemented in the shop floor at that location. Data changes in this status (and beyond) are maintained separately for each manufacturing location. Accordingly, only the manufacturing engineers and planners at that particular location should have access to the engineering change data.

The engineering change then enters "effective" status. In this status, the engineering change has been approved by the manufacturing engineers and is ready to be implemented in the shop floor whenever that change becomes effective. Preferably only certain manufacturing organizations have access to the design change for viewing or modifying the data.

Finally, the engineering change enters the "closed" phase where the design change has been made effective and has been closed so that no more changes can be made to the item using that particular design change reference number. At this stage, only certain manufacturing organizations may have access to the engineering change data for viewing purposes only.

It is known to store engineering change data in a data processing system. In such an automated engineering change system, a development engineer typically creates an item for test purposes and tests the item. A design engineer then creates an engineering change and adds that item as an affected item to that engineering change. Then, the affected item goes to pre-release status. The engineer then makes any necessary modifications to the design data and obtains all the necessary approvals. A design engineer then promotes that engineering change along with all the affected items to release status. A manufacturing engineer then accepts that engineering change to the manufacturing engineer's location. A copy of the design data now resides at the manufacturing engineer's manufacturing location in accept status. The manufacturing engineer adds any manufacturing data and promotes that engineering change and all its affected items to effective status. Any changes may be made to effectivity information at this stage. When no more changes need to be made, the manufacturing engineer then promotes the engineering change to closed status.

Conventional data security techniques are typically used in a computer-based engineering change control system.

Accordingly, a security level and a security category can be specified for every data element in the system. Each user of the system is associated with one or more security groups, and each security group is given access (for example, read/write, read only, or none) to one or more combinations of security level authority and access to a particular security category. Accordingly, any user in a given security group can access any data that has the same security category as one of the entries for that security group, and has a security level that is less than or equal to the security level allowed for this data by that same security group authorization. For example, if an engineering change was created with a level of 7 and is in the category of "turbine", only user groups that have access to levels 7 or higher and that have an access to category "turbine" will be allowed to access the engineering change. Other security protection such as password authorizations may also be provided.

Hardware Environment

As already described, the present invention may be implemented in any data processing system which includes a database of data elements which represent an industrial process, such as computer aided design, computer aided manufacturing, or document production. Since the invention will typically be used with large databases, it is preferably implemented in an object oriented computing environment. As is well known to those having skill in the art, object oriented computing environments are composed of a large number of "objects". An object is a data structure, also referred to as a "frame", and a set of operations or functions, also referred to as "methods", that can access that data structure. The frame has many "slots", each of which contains an "attribute" of the data in the slot. The attribute may be a primitive (such as an integer or string) or an object reference which is a pointer to another object.

Each defined object will usually be manifested in a number of "instances". Each instance contains the particular data structure for a particular example of the object. In an object oriented computing environment, data is processed by requesting an object to perform one of its methods by sending the object a "message". The receiving object responds to the message by choosing the method that implements the message name, executing this method on the named instance, and returning control to the calling high level routine along with the results of the method.

Objects may be grouped into object classes which define the types and meanings of the data, and the action requests (messages) that the objects in the class will honor. The individual objects containing data are called "instances" of the object. Object classes are defined to be subclasses of other classes. Subclasses inherit all of the data characteristics and methods of the parent class. They can add additional data and methods and they can override or redefine any data elements or methods of the parent class.

Referring now to FIG. 1, a data processing system 10 for the present invention will now be described. Data processing system 10 includes computer hardware units 16 such as a central processing unit (CPU) 17, main memory 18 and an input/output (I/O) interface 19, and may include peripheral components such as a display terminal 21, an input device 22 such as a keyboard or a mouse, nonvolatile data storage devices 23 such as magnetic or optical disks, printers 24 and other peripheral devices. In a CAD/CAM system, computer hardware unit 16 may also be connected to manufacturing equipment or engineering workstations. Data processing system 10 also typically includes microinstruction code 26, and an operating system 28. Object oriented computing environment 13 also operates in data processing system 10. It will be understood by those having skill in the art that object oriented computing environment 13 may operate across multiple computer platforms.

As one example, computer hardware 16 may be a computer having an IBM System 370 architecture. Operating system 28 may be an IBM multiple virtual storage (MVS) operating system. Object oriented computing environment 13 is preferably written in Intermediate C, which is an object oriented dialect of the C computer programming language and is similar to the C++ computer programming language. The design and operation of computer platforms and object oriented computing environments are well known to those having skill in the art and are described, for example in U.S. Pat. No. 5,161,225 to Abraham et al. entitled *Persistent Stream for Processing Time Consuming and Reusable Queries in an Object Oriented Database Management System*; U.S. Pat. No. 5,151,987 to Abraham et al. entitled *Recovery Objects in an Object Oriented Computing Environment*; and U.S. Pat. No. 5,161,223 to Abraham entitled *Resumeable Batch Query for Processing Time Consuming Queries in an Object Oriented Database Management System*, all assigned to the assignee of the present invention, the disclosures of which are hereby incorporated herein by reference, and in numerous textbooks such as *Object Oriented Software Construction* by Bertrand Meyer, published by Prentice Hall in 1988, the disclosure of which is hereby incorporated herein by reference.

The invention will now be described in terms of an engineering change control management system. In such a system, an engineering change control manager module operates as part of the object oriented computing environment 13. Object oriented computing environment 13 also includes a user interface through which users at a design or manufacturing location interact with the engineering change control manager. Nonvolatile data storage device 23 includes computer integrated manufacturing data elements including a master item table, an engineering change/manufacturing engineering change table, an affected items table, a location affected items table, a bill of material table and a location usage table.

In a typical engineering change control environment which is part of a CAD/CAM system, a large number of display terminals or workstations 21 are included. A design center, which may be a distinct physical location, typically contains a large number of individual workstations which enable design engineers responsible for an engineering change to interact with the engineering change control manager. Similarly, multiple manufacturing locations each typically include multiple workstations which interact with the engineering change control manager and which are used by manufacturing engineers at that location. However, it will be understood by those having skill in the art that multiple users from multiple locations or departments may access the engineering change control management system via a single workstation or shared workstations. The design of CAD/CAM systems are well known to those having skill in the art and need not be described herein further. The detailed design of an engineering and manufacturing change control system is described in U.S. Pat. No. 5,191,534 to Orr et al. entitled *Engineering and Manufacturing Change Control Mechanism* and assigned to the assignee of the present invention, the disclosure of which is hereby incorporated herein by reference.

Security Control System: Overall Design and Operation

The security controlling method and system of the present invention overcomes two major data security problems for data elements which represent an industrial process having a plurality of industrial process steps, and which are manipulated by a plurality of users. The first problem is the "status progression" problem and the second problem is the "location of residence" problem. Each problem will now be described.

STATUS PROGRESSION

Normally data progresses through various states as the data matures in its processing. For example, an engineering change progresses from pre-release to release or a file folder progresses from created to distributed to closed. Typically, while the data is in its primitive stage, access to it should be limited. For example, when the design for a new turbine is in development stage, only the development engineer's immediate group should have access. As the data progresses through various "maturing" stages, access to it should be changed. Sometimes access should be increased and sometimes it should be decreased. Moreover, when a given design is approved, the entire engineering design community needs to have access. When that design is released to manufacturing, the manufacturing community also needs to have access to it. It will be understood that each group can have a particular type of access, such as display only, display and update, or no access.

LOCATION OF RESIDENCE PROBLEM

There are situations where the same or similar data resides at multiple locations. A location is a logical location that may be associated with a manufacturing plant, a design center, an assembly line or even an aisle in a design engineering department. Location is not necessarily the location where the database containing the data itself resides. In a typical manufacturing enterprise, it is normal to have one design center that designs components that are ultimately manufactured in more than one manufacturing plant. For example, a company may design an engine in one location, but have the carburetor manufactured from two different plants. When the same design exists at the engineering location and also at multiple manufacturing locations, users associated with one manufacturing location could view or modify data for a different manufacturing location. Also, a design engineer at a design center, would be able to view or modify the data for manufacturing locations.

For example, a design engineer at a design center needs authority to update an item so he can design an item. Similarly, a manufacturing engineer at a first manufacturing location also needs authority to update an item since he needs to update some manufacturing items. A different manufacturing engineer at a second manufacturing location also needs authority to update an item so that he may develop some items that are specific to his manufacturing location. Since all engineers have the same access, and since there is no differentiation of security by location, each engineer will be able to view or modify the data that is associated with some other location.

The invention solves the status progression problem and the location of residence problem by assigning user groups to access predetermined groups of the data elements, also referred to as "data categories" at predetermined ones of the industrial process steps. The industrial process step at which access is permitted is identified by a status value. Access is only permitted to a user when he has been assigned access to the category of data and the category of data is at the status to which the user has been assigned. When user groups are at multiple locations and a copy of selected database elements is associated with each of the locations, the user is also prevented from accessing a copy of the selected database elements if the location associated with the copy is not the user's location. For example, in an engineering change process, different groups can access the data only at different phases of the engineering change process. Similarly, location specific data can only be accessed by users at that location. Accordingly, multiple groups of users can operate on the same data without degrading the security of the database.

Figure 2:
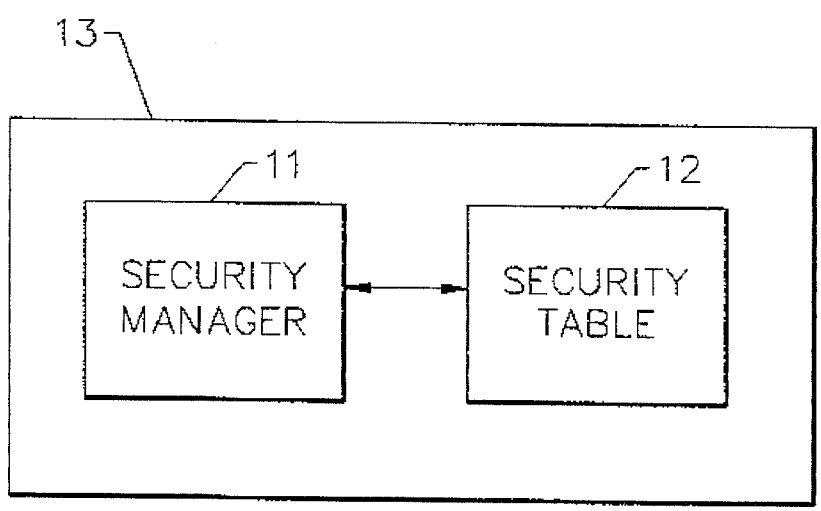
FIG. 2 is a block diagram of an object oriented computing environment including a security manager and a security table according to the present invention.

Referring now to FIG. 2, object oriented computing environment 13 (FIG. 1) includes a security manager 11 which manages security for the object oriented computing environment. Security manager 11 interacts with a security table 12. The security table associates users with data category. According to the invention, the security table 12 also includes fields for "status", so that it can map user groups to data categories and data status values. The security table 12 may also include a field for data location so that user groups can be mapped to data location in addition to data categories and data status values. It will be understood by those having skill in the art that security table 12 may also include other mappings as are required for other security functions. It will also be understood by those having skill in the art that security manager 11 may reside outside object oriented environment 13 in a conventional functionally programmed computing environment. Finally, it will be understood that the security table may be implemented using a plurality of associated tables as will be described in detail below.

Referring now to FIG. 3, operation of security manager 11 according to the invention will be described. As shown at Block 31, user groups are assigned to data categories, data status values and data locations by placing appropriate entries in the security table 12 or other mapping means as will be described in detail below. It will be understood by those having skill in the art that this assignment may be via a direct mapping, or indirect mapping via changes in security categories, as described below. After the initial assignment, user requests to access a data element are accepted at Block 32. Upon acceptance, a test is made at Block 34, as to whether the user has authority to access the data element when it is in the current status value. If not, user access to the data element is denied at Block 38. If yes, another test is made at Block 35 as to whether the data category has multiple copies. If multiple copies exist, then at Block 36 a test is made as to whether the user has authority to access the location corresponding to the requested copy. If not, user access is denied. If the user has access for that location, status and data category, then at Block 37 user access is granted to the data element. It will be understood that the access which is granted may be read only or read/write access, and the access which is denied may also be write access or read/write access.

A particular implementation of the security table 12 (FIG. 2) will now be described. In this implementation, the security category field is used to differentiate between users who have access to a data element based on the status and/or location of the data element. Each object invokes this mechanism whenever that object either undergoes a status change or a location change or both. This mechanism uses the predefined security mappings to switch the security category of the object appropriately. Thus, upon access attempt, only the object's category need be checked in order to implement security control based on status and location. It will be understood by those having skill in the art, however, that other techniques for mapping user groups to data categories, data status values and data locations may be used according to the present invention.

Referring now to FIG. 4, a first embodiment of a security table according to the invention will now be described. The security administrator can define a mapping of the various statuses in which data can exist and the corresponding changes in the security category for each state, as will be described below. As shown in FIG. 4, the mapping may be indexed by the target (new) status and the current (from) category. When a row in the table is found that matches these values, then the third column provides the target (to) category to be assigned to the data. Whenever data elements progress from one state to another, the security manager 11 switches the security category of the data in existing security access tables, from the category corresponding to the old status to the category corresponding to the new status. Note that the data is assumed to be initially created with category SecCat01.

The security administrator using the security manager 11, can associate each of these categories with various sets of users who are allowed access to the data elements while in that status. One set has access to one category (and thus to data at the corresponding status) and another set has access to the next category (and thus to the data at that next status). FIG. 5 illustrates an example of this mapping.

It will be understood by those having skill in the art that security level is ignored in FIG. 5 for the sake of simplicity. However security level is a participant in the actual determination of whether a user can access any particular object data. The mapping mechanism can also change the security level as the data status progresses (such as from "Top Secret" to "Confidential"). Other criteria may also be added to the determination of whether a user can access any particular data, such as password access, as is well known to those having skill in the art. It will also be understood that there are typically multiple types of access such as read only, read/write and no access.

Referring to FIG. 5, users U1,U2,U3,U4 will have access to the group of data elements while it is at its initial status value, Status1. When a user promotes the data from Status1 to Status2, the security manager changes the security category from SecCat01 to SecCat02 based on FIG. 4. Since U1 and U2 do not have access to SecCat02, they will lose access to this data as soon as that data moves from Status1 to Status2. At that same time, U3 and U4 will retain access, and U5 and U6 gain access. This process continues for the other status transitions.

It will be understood by those having skill in the art that since a user can be a part of many user groups, a user group having access to a particular category and another user group having access to the next sequential category (statuswise) can have common users. A security administrator can thereby progressively expand the list of users who can have access to the data as the data progresses through various statuses, and delete some users as the data progresses towards its final status.

It will also be understood by those having skill in the art that a typical security table would include multiple mappings for a single status value in order to allow the security mapping of the present invention to control independent projects. Each project would follow the same business processes and thus would have the same status progressions. Independent category values are preferably used so that users in different projects cannot access one another's data. A security table for a turbine project and a carburetor project is illustrated in FIG. 6.

It will also be understood by those having skill in the art that different actions may be performed if the security table lookup does not succeed. For example, a failure message can be sent in response to the request to change status or the category may merely be left in its prior state. Moreover, "wild cards" may be permitted in either the target status or old category fields. As understood by those having skill in the art, a "wild card" is a pseudo value that will match any value in a given field. Wild cards can reduce the number of table entries needed by a large organization.

Finally, it will also be understood that additional security criteria may be added to those already described. For example, "object type" and "action allowed" may be added to the security table. Adding "object type" allows tables to be defined that permit some users to access certain parts of the project data while other users would have access to other parts. Adding "action allowed" would allow tables to be defined that permit some users to have update authority to certain data while other users would only be able to view it. Additional mappings may also be provided. For example, security levels may be mapped when status changes, in a manner similar to the security category mapping described above. Security level mapping can be performed in conjunction with the security category mapping. It could determine the new level/new category pair based on the triplet of new status/old level/old category. Alternatively, two separate mappings may be provided, from new status/old category to new category, and from new status/old level to new level.

Security based on status and location will now be described. In this embodiment, the security category field is also used to control the security access to data as it moves from one location to another. FIG. 7 illustrates an embodiment of a security table, including status and location.

Referring to FIG. 7, assume that an object has 5 states: Status1 through Status5. There are four locations: LOC1 through LOC4. When the status changes from Status1 to Status2, the data is still intended for LOC1. This status progression will occur only once. When the status changes from Status2 to Status3, the data is not only progressed in status, but it is converted to a separate version (view) for one of its four locations. This status progression from Status2 to Status3 can occur once per location. In other words, every location can promote the data once from Status2 to Status3 for their specific location. Accordingly, in the this example, the object can be promoted from Status2 to Status3 three times: once for LOC2, once for LOC3 and once for LOC4.

The security manager will perform the following actions based on the contents of the security table of FIG. 7: When the object status changes from Status1 to Status2, there is no change in location; however the category is changed from SecCat01 to SecCat02. When LOC1 promotes the object from Status2 to Status3 for LOC2, the object category at LOC1 is not changed. However, the object data is copied into a LOC2 view and the category of the object data (for LOC2) is set to SecCat12. Now, the security administrator can set the user groups such that only the users who will be working from LOC2 have access to SecCat12 data. The same action will occur for LOC3 and LOC4.

Security Control Method and System: Detailed Design and Operation

The detailed design and operation of the security controlling method and apparatus of the present invention will now be described. This detailed description will describe the modifications which are necessary for an object oriented programming system to incorporate security control based on status and location.

In particular, the security administrator decides on the object whose status progression and location change is to be secured; for example, engineering change (EC), affected item (AI), file folder. The security administrator then decides the number of locations at which the object could exist; for example Plant1, Plant2, AssemblyLine1. The security administrator then decides the users who will need access to this object and the locations and states in which access is authorized. The security administrator then accesses the security manager and inputs all the information to the system as a one time set up, as described below. This populates the security table 12.

In order to implement the operations of FIG. 3, modifications are made to the object oriented computing environment. New object classes are created to capture all mapping information. The new object classes allow the security administrator to specify the mapping between the new and old security categories of the chosen object. New methods are also created to find a correct mapping for a given object that is going into a target status to a target location. These methods are associated with a common parent class from which all objects which are controlled by the security manager inherit. Logic is also added in every object that will be controlled by the security manager, to switch the security when a status progression occurs or a copy to a new location occurs. The new classes, new methods and logic will now be described in detail.

New Classes

A new object family is created for defining the security category mapping. The object family includes the following classes:

| | |
|---|---|
| LIST PANEL | To list all mappings |
| ENTRY PANEL | To enter the mapping data |
| SEARCH CRITERIA POPUP PANEL | To determine the category mappings displayed to the user based on the object class entered. |
| STREAM | To internally generate a list of security category mappings for the object class. |
| STREAM ELEMENT | To prepare one element in the list of mappings |
| OBJECT CLASS | To store the mapping data into a database |
| ABSTRACT CLASS | To store common information about which object has "by status" security and which has "by location" security. |

New Methods

There is a frame class from which all objects (and object classes) that need to be stored in a database inherit. Two new methods are added to this common frame class as follows:

CATG_CHANGE METHOD

Whenever an object using status-only mapping goes through a status progression, that object calls the catg_ change method on the frame class and has the security category of that object changed from the existing security category to the new security category that maps to the new status into which the object is progressing.

This method includes logic to search the security table to find a match for the object class, the old security category, and the target status into which this object is progressing. Once the match is found, this method finds the corresponding new security category in that match record and changes the category of the object to the new security category. If a match is not found, then an implementation specific response can be made. For example, the old value is not changed or an error message is sent. This method has the following behavior:

```
procedure catg_change (
    SELF.Class_ID,
    NEW_STATUS)
Where:
    SELF -
    is the class which is to be used to find the
    security category for the mapping
    NEW_STATUS -
    is the status to which the object is being
    promoted.
```

CATG_CHANGE_BYLOC METHOD

This method is used by classes which require security category change when there are changes in status and location. Whenever an object using status and location mapping goes through a status progression, that object calls the change_byloc method on the frame class, to change the security category of that object from the existing security category to the new security category that maps to the new status into which the object is progressing and to the new location. This method includes logic to search the security mappings table to find a match for the object class, the old security category, the target status and the target location into which this object is going. Once the match is found, this method finds the corresponding new security category in that match record and will change the category of the object to the new security category. If a match is not found, then an implementation specific response can be made. For example, the old value is not changed or an error message is sent. This method has the following behavior:

```
procedure catg_change_byloc (SELF.Class_ID,
    FROM_LOC,
    TO_LOC,
    NEW_STATUS)
Where:
    SELF - is the class which is to
    be used to find the
    security category for the
    mapping
    FROM_LOC - is the "promoting from"
    location
    TO_LOC - is the "promoting to"
    location
    NEW_STATUS - is the status to which
    the object is being
    promoted.
```

New Logic

Logic is inserted into all objects that should have their security category changed when their status (or status and location) changes. This logic invokes the catg_change or catg_change_byloc methods described above whenever the object recognizes that it is going through a status change.

Example syntax of the calls to these methods are:

```
SELF.catg_change (SELF.Class_ID, NEW_STATUS)
and
    SELF.catg_change_byloc (SELF.Class_ID,
        FROM_LOC, TO_LOC,
        NEW_STATUS)
```

Every object that needs to be secured by status or by location, includes, in addition to any normal data, two fields to contain its current security category and security level.

Security Table

A detailed embodiment of the security table is illustrated in FIG. 8. As shown, this table contains the following fields:

| TABLE COLUMN | CONTENTS OF COLUMN |
|---|---|
| CLASS ID | Name of the class for which the security mapping definition applies. |
| DESCRIPTION | Description of the mapping definition. |
| TARGET STATUS | Target status to which the mapping applies. |
| "FROM" SECURITY CATEGORY | Category in the current status. |
| "TO" SECURITY CATEGORY | Category in the target status. |
| "FROM" LOCATION | Current location of the object. |
| "TO" LOCATION | Location to which the object is going. |

As already described, the CATG_CHANGE AND CATG_CHANGE_BYLOC methods use the security mapping table to determine the new security category.

Display panels used to define and maintain security mapping definitions for two object types in an object oriented environment will now be described. One of the objects belongs to a specific location (a logic domain to which objects can be associated). To locate an object of this type one must know the location to which the object belongs. The other object does not have this characteristic. The security mapping definition accommodates both of these characteristics. The security mapping definition panels are typically unique to an object. Objects that have the location characteristic specify the location information as part of their security mapping definition.

Thus, a common program (the panel object) can display unique screens per object type using object oriented functions such as sending a message to an arbitrary object and asking the object what panel to use for its object type. This uses the object oriented concepts of polymorphism and abstract classes. Polymorphism means that the message sender only knows that the target class is a descendant of a generalized class (such as a class which specifies objects that can have security mapping). The descendants can individually redefine the implementation of that message call, for example by returning a unique panel name per class. An abstract class is a class that multiple other classes can inherit and which defines a particular capability such as being mappable. It defines the attributes and actions that such a class must have and thus to what messages it must respond. In this case, all objects that perform security mapping inherit from an abstract class that requires them to implement a feature that returns the identifier of a dialog panel containing proper terminology for that particular object. Thus, a common mechanism can be used to perform the mappings for each of the various object classes that are being mapped, each with its own possibly unique valid status values.

Figure 9A:
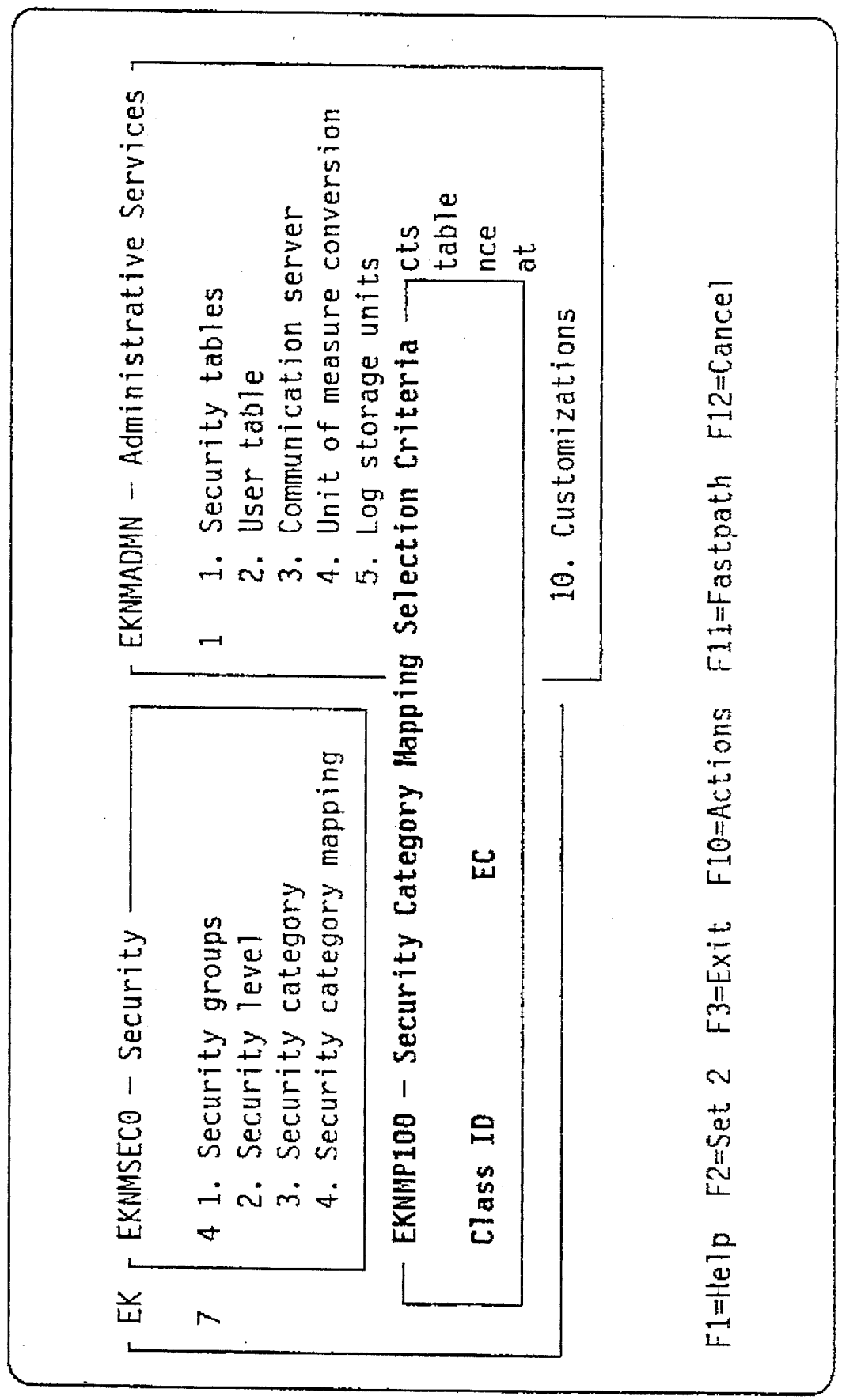

FIGS. 9A, 9B and 9C illustrate panels used by a security administrator for defining and maintaining security mapping definitions in an object environment for an object that is not associated with location. The engineering change (EC) object is used in this example.

Panel EKNMP100 prompts the security administrator for the name of the object for which the security mapping is to be defined. In FIG. 9A, the class ID of the engineering change object was entered. Next the existing security mappings for the engineering change object are displayed as illustrated in FIG. 9B. The name of the panel dialog tags to be used for displaying the list of security mapping definitions is obtained from the object that was specified on the EKNMP100 panel (in this case the engineering change object). Accordingly, the panel title and status value translations (from an internal code to a displayable value) will be appropriate for the object being mapped. A single underlying panel program can thereby handle many differing objects.

Panel EUOET100 lists the existing security mapping definitions for the engineering change object. Through this list panel a security administrator can create new security mapping definitions, change existing security mapping definitions and delete existing security mapping definitions. The panel in FIG. 9C is used to create and change security mapping definitions for the engineering change object.

The columns of the list in FIG. 9B have the following meanings:

Target Status

This field identifies the status value at which the security mapping for the object is to occur. When an object with the from category first moves into the target status identified for this mapping, the security category mapping occurs.

From Category

This field contains a security category that was assigned to the object prior to the status change. When an object with this category first moves into the target status identified for this mapping, the security category mapping occurs.

To Category

This field contains the category that is to be assigned to the object during the status change if the mapping conditions are met.

Description

This field contains free form text which may be a short description or comment about the security mapping definition.

The example in FIG. 9B will cause engineering change objects with initial security category values of SEC_CATEG_DEV1 to change their security category to SEC_CATEG_PRE1 upon entering the PRE_RELEASE state. These same engineering change objects will then change to SEC_CATEG_REL when they reach the RELEASE state. FIG. 9B will also cause engineering change objects with initial security category values of SEC_CATEG_DEV2 to change their security category to SEC_CATEG_PRE2 upon entering the PRE_RELEASE state. Those same engineering change objects will then change to SEC_CATEG_REL when they reach the RELEASE state. Accordingly, the mapping can be used to combine separate security category groupings when they reach some common state.

Figure 10A:
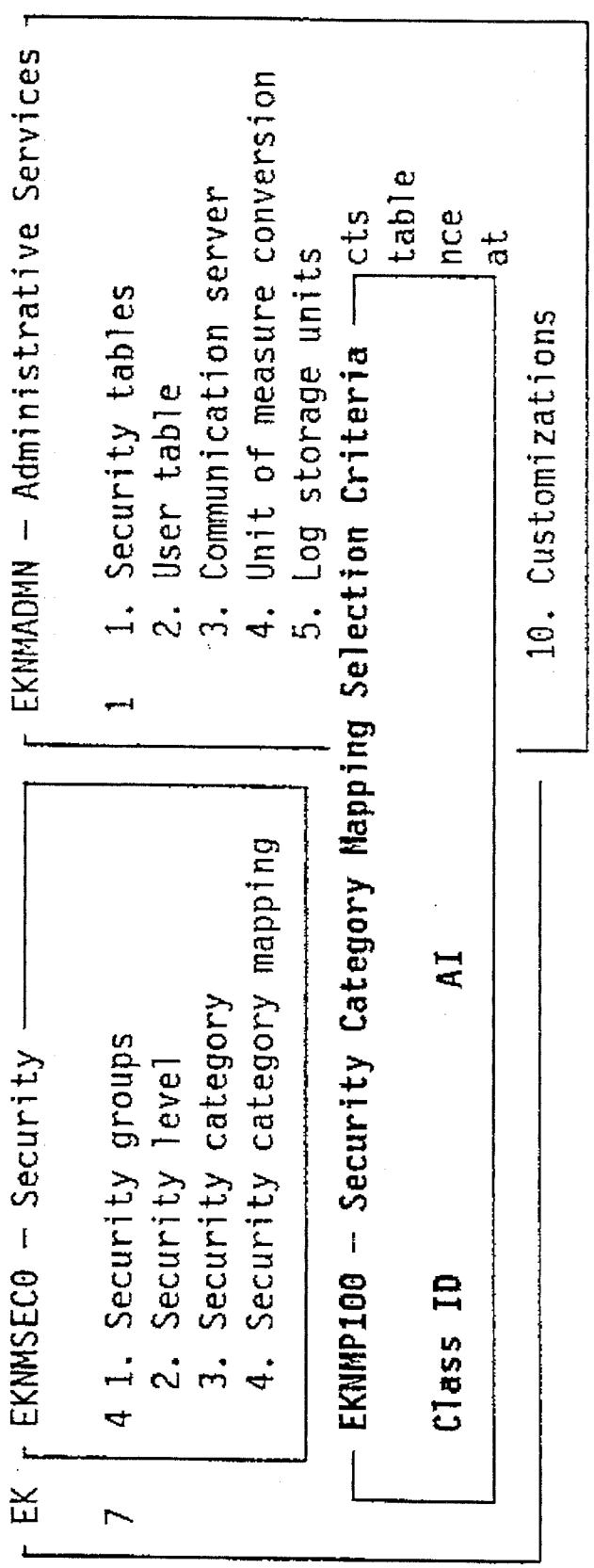

Panel EUOEE100 (FIG. 9C) is used to create and change security mapping definition for the engineering change object. The target status states are unique to the engineering change object. The name of the panel dialog tags to be used for displaying the security mapping definition are obtained from the object that was specified on the EKNMP100 panel (in this case the engineering change object). Accordingly, the panel title and status value translations (from an internal code to a displayable value) will be appropriate for the object being mapped. A single underlying panel program can thereby handle many differing objects that can be mapped. FIGS. 10A, 10B and 10C show the panels used for defining and maintaining security mapping definition for an object that is associated to a location. The affected item (AI) object is used in these examples.

As described above, panel EKNMP100 (FIG. 10A) prompts the security administrator for the name of the object for which the security mapping is to be defined. In this example, the class ID of the affected item object was entered. Next the existing security mapping for the affected item is displayed (FIG. 10B). The name of the panel dialog tags to be used for displaying the list of security mapping definitions is obtained from the object that was specified on the EKNMP100 panel (in this case the Item object). Accordingly, a panel title and status value translations (from an internal code to a displayable value) will be appropriate for the object being mapped. A single underlying panel program can thereby handle many differing objects that can be mapped.

Panel EUOST100 (FIG. 10B) lists the existing security mapping definitions for the item object. Through this list panel a security administrator can create new security mapping definitions, change existing security mapping definitions and delete existing security mapping definitions. The panel in FIG. 10C is used to create and change security mapping definitions for the item object.

The columns of the list have the following meanings:
Target Status
This field identifies the status value at which the security mapping for the object is to occur. When an object with the from category and from location ID first moves into the target status identified for this mapping and which will now have the specified to location ID, the security category mapping occurs.
From Location ID
This field contains a location ID that was assigned to the object prior to the status change.
To Location ID
This field contains the location ID that will be assigned to the object after the status change. This is specified by the application rather than being an output of a security mapping.
From Category
This field contains a security category that was assigned to the object prior to the status change.
To Category
This field contains the category that is to be assigned to the object during the status change if the mapping conditions are met.
Description
This field contains free form text which may be a short description or comment about the security mapping definition.

The example in FIG. 10B will cause item objects currently at location ENG_LOC1 with initial security category values of SEC_CATEG_REL and being accepted at MFG_LOC1 to change their security category to SEC_CATEG_AC1 upon entering the ACCEPT state. These same item objects will then change to SEC_CATEG_EFF when they reach the EFFECTIVE state at this same location. This example will also cause item objects currently at location ENG_LOC1 with initial security category values of SEC_CATEG_REL and being accepted for MFG_ LOC2 to change their security category to SEC_CATEG_AC2 upon entering the ACCEPT state. Those item objects will then change to SEC_CATEG_EFF when they reach the EFFECTIVE state at this same location.

Panel EUOSE100 (FIG. 10C) is used to create or change security mapping the definition for the item object. The target status states are unique to the item object. The name of the panel dialog tags to be used for displaying the security mapping definition is obtained from the object that was specified on the EKNMP100 panel (in this case the item object). Accordingly, panel title and status value translations (from an internal code to a displayable value) will be appropriate for the object being mapped. A single underlying panel program can thereby handle many differing objects that can be mapped.

Security Control Method and System Example

A specific example which illustrates the changing of security based upon status changes according to the present invention will now be described.

For this example, assume there is an engineering change object EC1 which exists in PRE_RELEASE condition. Also assume the security category attribute of EC1 is currently SEC_CATEG_PRE1 and its security level attribute is SEC_LEVEL4. The object EC with number EC1 has two affected item (AI) objects (AI1 and AI2) associated with it. Also assume the two objects AI1 and AI2 both are in PRE_RELEASE status and have a security category attribute of SEC_CATEG_PRE1 and security level attribute of SEC_LEVEL4. Assume that the user USER_ENG1 has completed all necessary design changes using the EC1 and would like to promote EC1 to the next state. The user (USER_ENG1) brings up a list of ECs and then opens EC1 with the intent of promoting EC1 from PRE_RELEASE status to RELEASE status.

The example also assumes that the necessary security has been set up and that Tables 1–6 illustrated in FIG. 11 have been set up using the methods and panels already described. It will be understood by those having skill in the art that Tables 5 and 6 constitute the basic security table, with Tables 1–4 being support tables for the security tables. Table 5 is a security access table, which maps user groups, corresponding categories of data elements and corresponding data elements. It is accessed when a user requests access to a data element or group of data elements. Table 6 is a security category mapping table, which maps industrial process steps and old security categories to new security categories. Upon change of the industrial process step, this table is used to change the security categories in the data elements' security category attributes, so that access authority is changed. Tables 1–4 may be included as separate tables or may be included as part of the security table.

Figure 12A:
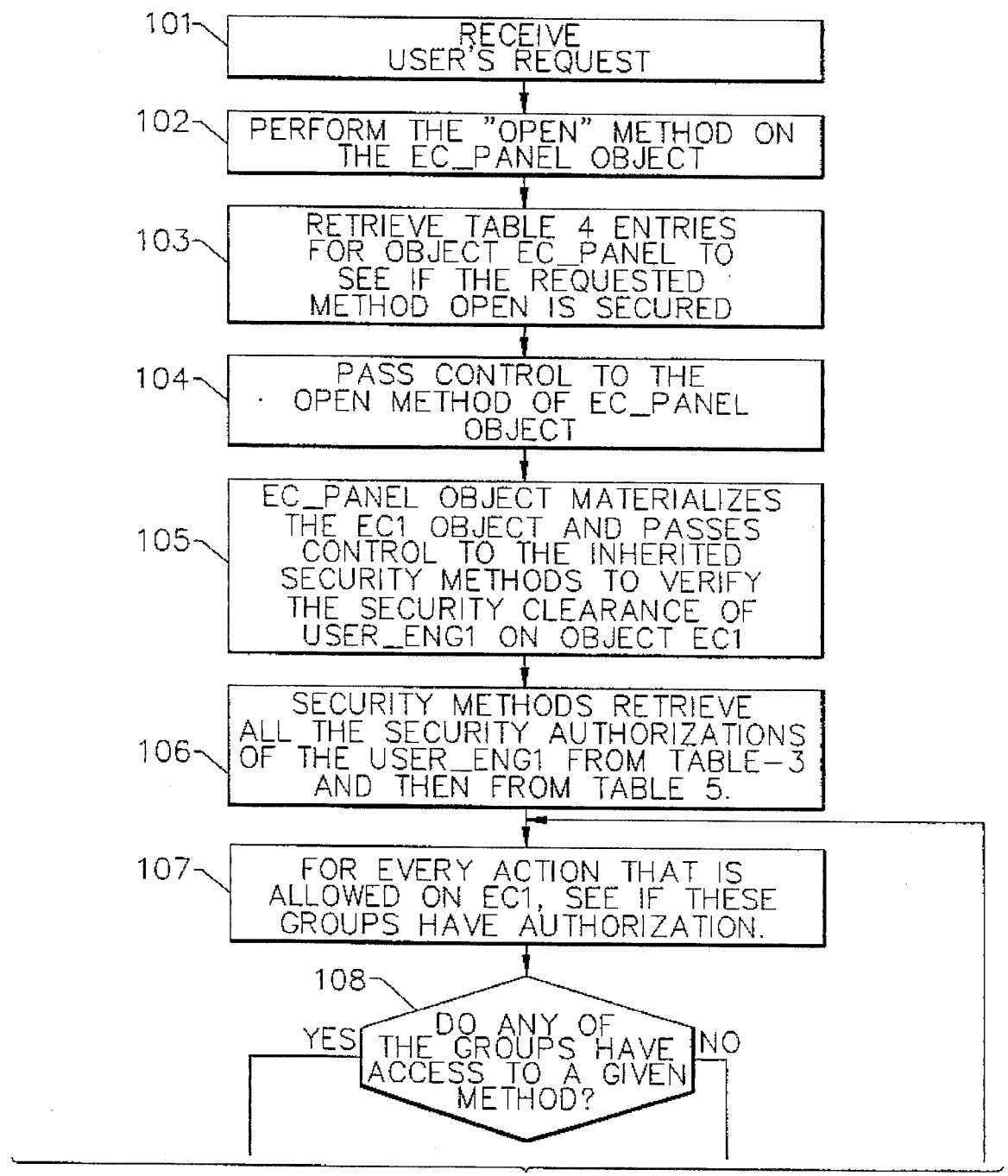
FIGS. 12–15 illustrate detailed operations performed by a security manager according to the present invention.
Figure 12B:
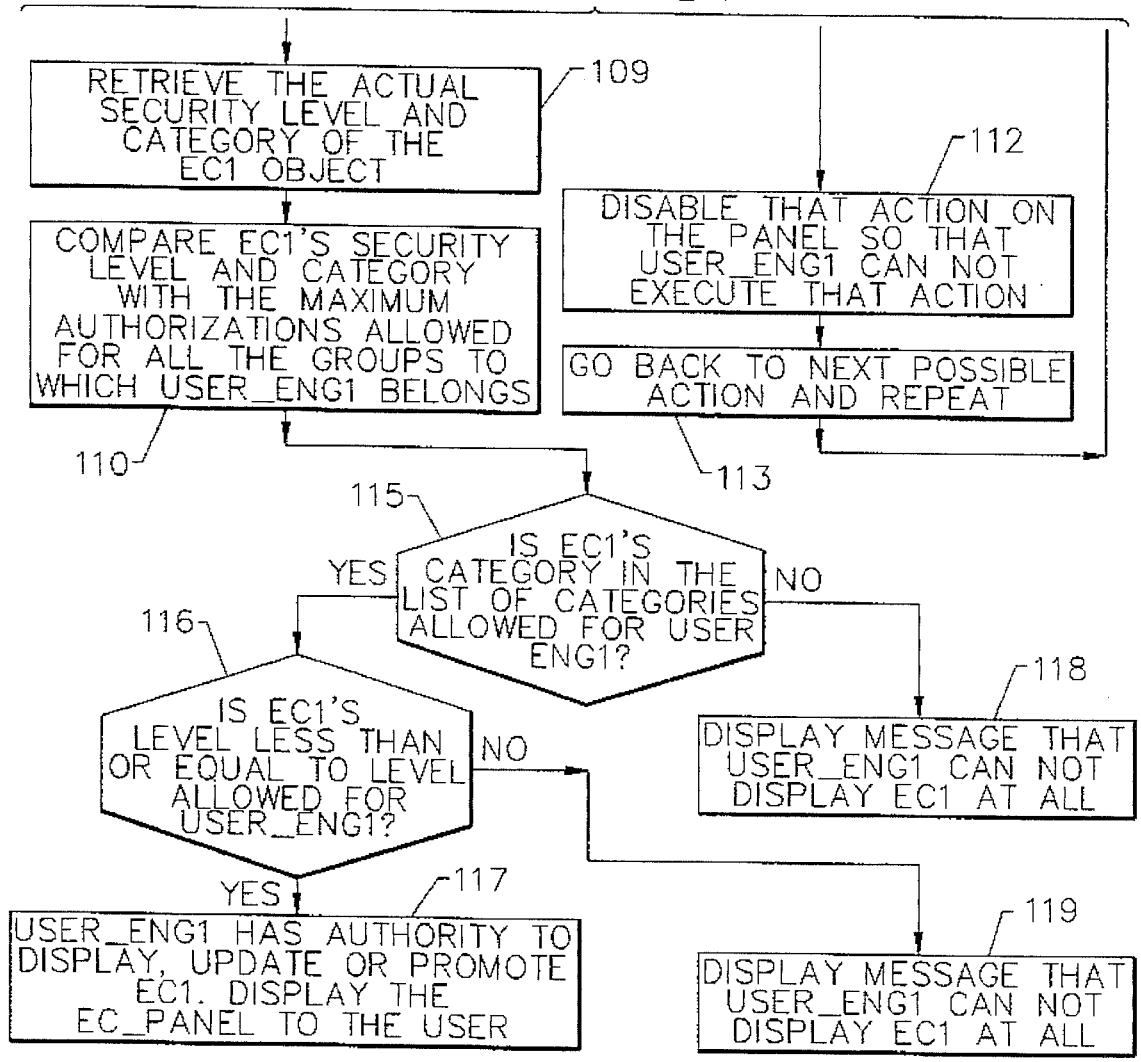

FIG. 12 illustrates operations to perform the security verifications, to promote EC1 to RELEASE, and then to change the security of the object so that manufacturing engineering (USER_MFG) can now view EC1. Note from Tables 3 and 5 that USER_MFG1 belongs to group SEC_GROUP_MANUFACT and that group is not authorized to perform any actions upon objects of type EC or AI when they have security category SET_CATEG_PRE1. That group is authorized to display AUTH_DISPLAY for those objects when their security category is SET_CATEG_REL.

Referring now to FIG. 12, operations begin when the security manager 11 receives a request from USER_MFG1 to open the engineering change EC1 (Block 101). The open method on the EC_Panel object is called at Block 102 and Table 4 is retrieved to see if the requested method open is secured at Block 103. Since the object is not secured, at Block 104 control is passed to the open method of the EC panel object. At Block 105 the EC panel object materializes the EC1 object and passes control to the inherited security methods to verify the security clearance of USER_ENG1 on object EC1. In response, at Block 106, all of the security authorizations of the user are retrieved from Table 3 to see the groups to which he belongs, and then from Table 5 to see the authorizations in each of these groups.

Then, at Block 107, for every action that is allowed on EC1, each group is checked to see if they have authorization. A test is made at Block 108 as to whether any of the groups have access to a given method. If yes, then at Block 109 the actual security level and category of the EC1 object is retrieved, and at Block 110 the security level and category are compared to the maximum authorizations allowed for the groups to which the user belongs. If not, then at Block 112 the action on the panel is disabled so that the user cannot execute the action, and processing returns at Block 113.

Assuming at Block 110 that the security level and category are allowed, then access to this specific instance is checked at Block 115 by checking if the security category is in the list of categories allowed for the specific user. If yes, a check is made as to whether the level is less than or equal to that allowed by the user at Block 116, and if yes, then the user has authority to display, update or promote the object at Block 117 and the appropriate panel is displayed. On the other hand, if the results of the test at Blocks 115 or 116 are no, then a message is displayed that the user cannot display the requested engineering change (Blocks 118 and 119) and processing ends. Accordingly, at the conclusion of Block 117, the user is on the EC panel.

Figure 13:
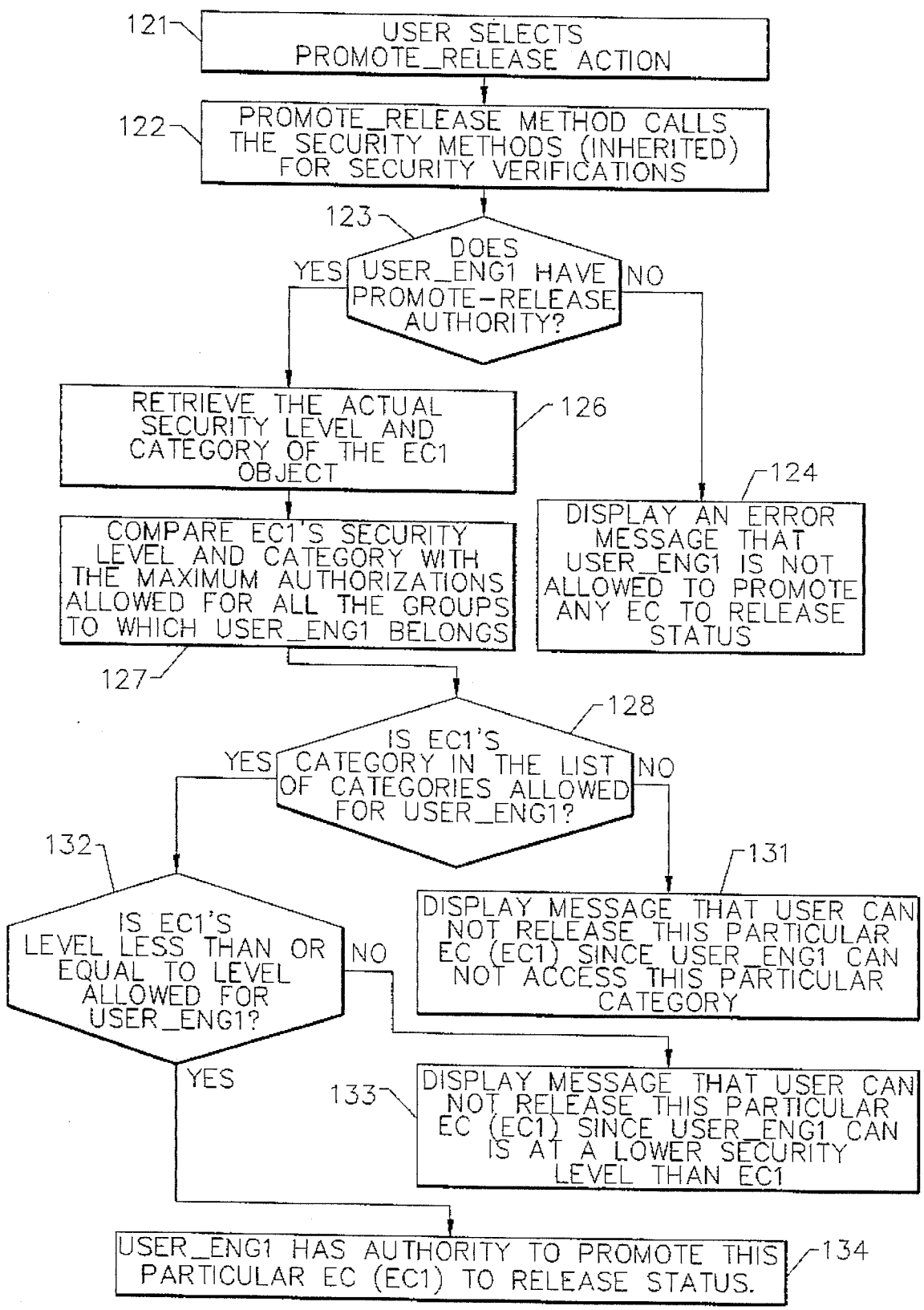

Referring now to FIG. 13, the operations for performing a promote release action will now be described. FIG. 13 illustrates how the system verifies the security of the user with respect to the user's action on the engineering change. Since the specific engineering change contains a set of affected items (AIs) the AIs themselves are automatically promoted to release status. Then, the system changes the status of EC1 to release and the new security category for EC objects that move to release status is assigned to EC1. The AIs on EC1 are also promoted to release.

In particular, at Block 121, the user selects the promote release action. At Block 122, the promote release method calls for the existing inherited security methods for security verifications. A test is made at Block 123 as to whether the user has promote release authority. If not, an error message is displayed at Block 124 and processing ends. If yes, the actual security level and category of the EC1 object is retrieved at Block 126, and a comparison is made with the maximum authorizations allowed for all of the groups to which the particular user belongs at Block 127.

At Block 128 a test is made as to whether the security category is in the list that is allowed. If not, at Block 131 an error message is displayed and processing ends. If yes, another test is made as to whether the security level is less than or equal to the level allowed for the user at Block 132. If not, an error message is displayed at Block 133 and processing ends. If yes, then the user has the authority to promote the particular engineering change to release status and the operations to start the actual release process are initiated at Block 134. These operations are illustrated in FIG. 14.

Figure 14:
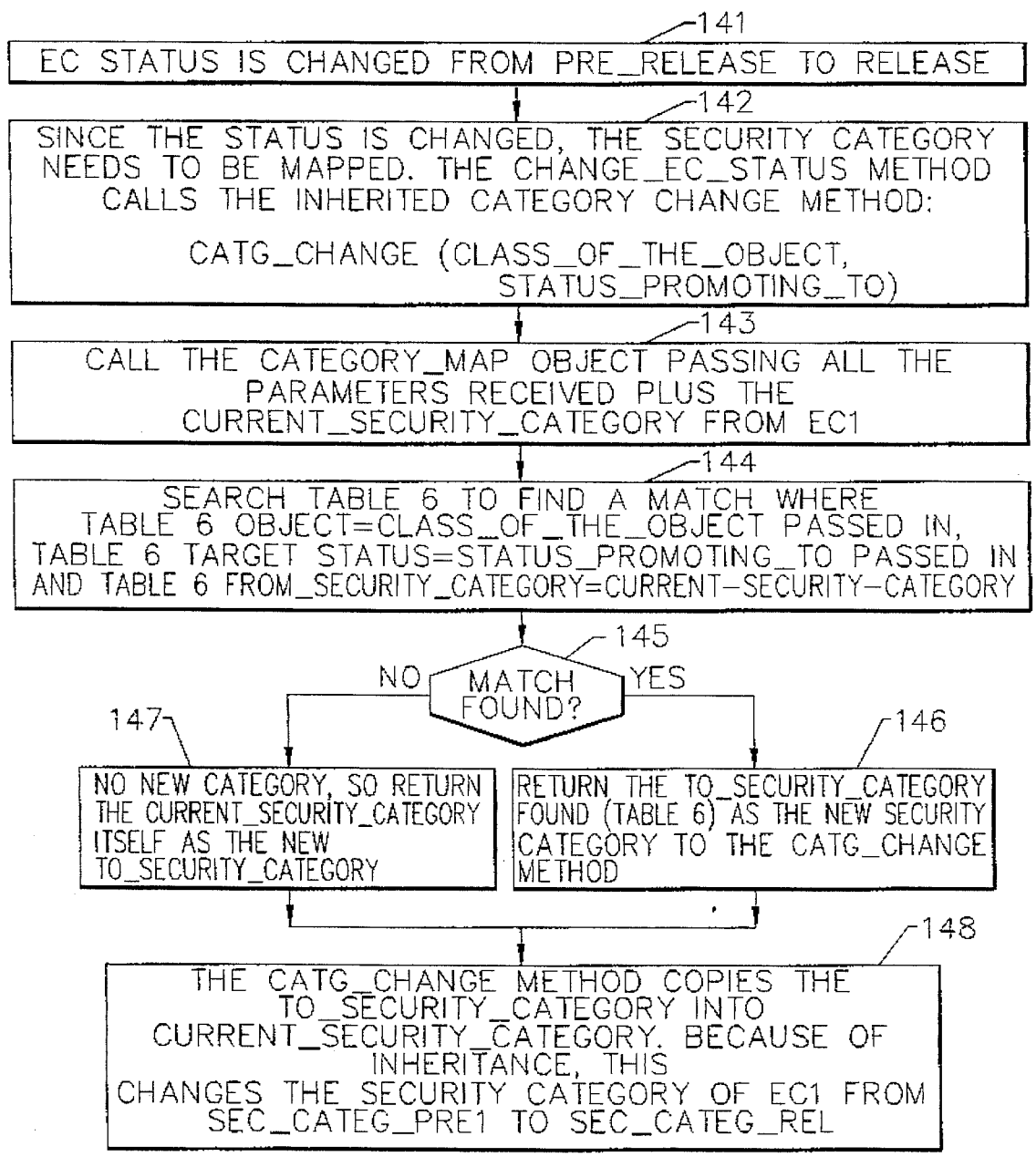

Referring now to FIG. 14, at Block 141, the engineering change status is changed from pre-release to release. Then at Block 142, since the status is changed, the security category needs to be mapped. Mapping is performed by calling the inherited category change method. At Block 143, the category map object is called and Table 6 is searched to find a match (Block 144). If a match is found (Block 145), then the category that is found as a match is the new category (Block 146). If no match is found, then the current category is maintained at Block 147, and an error message may be sent. Then, at Block 148, the security category is actually changed. Now that the security category has been mapped correctly, the two affected items that belong to EC1 are promoted as illustrated in FIG. 15.

Figure 15:
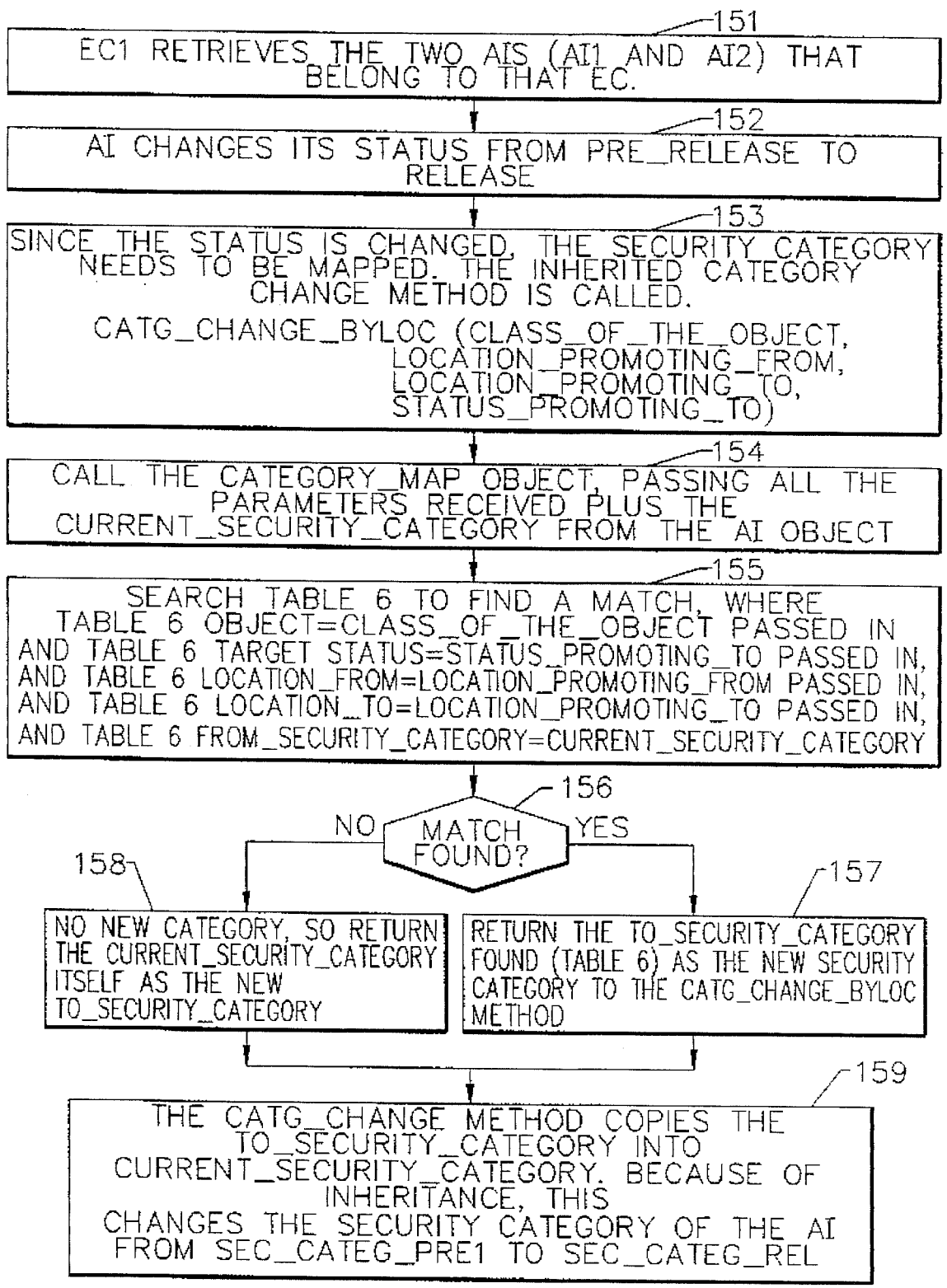

Referring now to FIG. 15, at Block 151, the two affected items (AIs) that belong to that EC are retrieved. After validations, the AI changes its status from pre-release to release at Block 152 and the security category is mapped at Block 153 by calling the category map object at Block 154 and searching Table 6 at Block 155, as already described with respect to FIG. 14. If a match is found (Block 156), then the security category is changed at Block 157. If no match is found, then the security category is not changed (Block 158). Security category then is actually changed at Block 159 and the process ends. At this point, since the security categories have been modified automatically, the user MFG1 will now be able to display the same EC1 and its AIs.

It will be understood by those having skill in the art that although the invention has been described relative to an engineering change mechanism, the invention may be used with any system through which data progresses from a preliminary state of readiness to a final state. For example, the invention can be used with file folders as they go through their status progression. Moreover, it will be understood that although the detailed description refers to a location as a manufacturing site, the "location" concept can be applied to various departments as well. Finally, the invention can also map based on other security related fields other than status or location. The security mapping may be by other data elements of the objects, such as contract number or project number of an engineering change, for example, and can also be used to map other fields such as security level or password.

An important difference between a status field and other fields is that the value of a status field typically changes due to an event in an industrial process occurring, rather than the user changing the value. When the status value changes the security access can change; i.e. more users can gain access or access can be reduced. In contrast, a non-status field tends to be static. A status field also typically has a set of predefined values. A non-status field may not have predefined values.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for controlling security of data elements which represent an industrial process and which are manipulated by a plurality of users on a data processing system, said industrial process comprising a plurality of industrial process steps, said data security method comprising the steps of:

assigning predetermined groups of said plurality of users to access predetermined groups of said data elements at predetermined ones of said industrial process steps wherein at least one of said predetermined user groups is associated with a plurality of locations, and wherein selected data elements are associated with each of said locations;

accepting a request from a user to access a selected data element; and preventing the access requesting user associated with a predetermined location from accessing said selected data element if the access requesting user is not a member of one of said predetermined groups of said users which has been assigned access to a predetermined group of data elements which includes said selected data element, if the industrial process is not at an industrial process step corresponding to said predetermined ones of said industrial process steps or if said selected database elements are not associated with the predetermined location.

2. The method of claim 1 wherein said assigning step comprises the steps of:

providing a first table executing on said data processing system, which maps said predetermined groups of users including user location to corresponding security categories;

providing a second table executing on said data processing system, which maps said plurality of industrial process steps to at least one old security category and to a corresponding at least one new security category and at least one old location and a corresponding at least one new location; and in response to operator input, entering into said first and second tables user groups including user location, industrial process steps, corresponding old and new security categories and corresponding old and new locations.

3. The method of claim 2 wherein said accepting step is preceded by the steps of:

accepting an indication that said industrial process has progressed from a first industrial process step to a second industrial process step;

identifying from said second table, old security categories and new-security categories and old locations and new locations corresponding to said second industrial process step;

identifying occurrences of security categories and user locations corresponding to said old security category in said first table;

identifying data elements which include an associated security category corresponding to said old security category in said first table; and replacing the identified security category occurrences associated with said identified data elements with the corresponding new security category from said second table; and wherein said access preventing step comprises the step of preventing the access requesting user from accessing the requested data elements based upon the replaced new security categories associated with said data elements.

4. The method of claim 1 wherein said industrial process is a computer automated design and manufacturing process, and wherein each of said industrial process steps is a computer automated design or manufacturing step.

5. The method of claim 1 wherein said industrial process is an engineering change order process for a manufacturing process, and wherein said industrial process steps comprise steps for designing, revising and approving an engineering change order.

6. The method of claim 1 wherein said access preventing step comprises one of preventing reading, preventing writing and preventing both reading and writing of the requested data element by the requesting user.

7. A method for controlling security of data elements which are manipulated by a plurality of users on a data processing system, said data security method comprising the steps of:

assigning one of a series of status values to predetermined groups of said data elements, said series of status values representing progression of processing of said data elements through a series of processing steps on said data processing system wherein at least one of said predetermined user groups is associated with a plurality of locations, and wherein selected data elements are associated with each of said locations;

associating predetermined groups of said plurality of users with predetermined groups of said data elements and predetermined ones of said series of status values;

accepting a request from a user to access a data element; and preventing the access requesting user associated with a predetermined location from accessing said selected data element if the access requesting the user is not a member of one of said predetermined groups of said users associated with a predetermined group of data elements which includes said selected data element, if the status value associated with said predetermined group of data elements is not one of said predetermined ones of status values associated with said predetermined group of data elements, or if said selected data elements are not associated with the predetermined location.

8. The method of claim 7 further comprising the steps of:

reassigning the status value which is associated with at least one of said predetermined groups of data elements;

accepting a request from a user to access a data element which is associated with a reassigned group of data elements; and preventing the access requesting user from accessing the requested data element if the access requesting user is not a member of one of said predetermined groups of said users which is associated with the reassigned group of data elements or if the reassigned status value associated with said reassigned group of data elements is not one of said predetermined ones of status values associated with said predetermined group of said users including the access requesting user.

9. The method of claim 7 wherein said assigning step comprises the steps of:

providing a first table executing on said data processing system, which maps said predetermined groups of users including user location to corresponding security categories;

providing a second table executing on said data processing system, which maps said series of status values to at least one old security category and to a corresponding at least one new security category and at least one old location and a corresponding at least one new location; and in response to operator input, entering into said first and second tables user groups including user location, status values, corresponding old and new security categories and corresponding old and new locations.

10. The method of claim 9 wherein said accepting step is preceded by the steps of:

accepting an indication that said status value has progressed from a first status value to a second status value;

identifying from said second table, old security categories and new security categories and old locations and new locations corresponding to said second status value;

identifying occurrences of security categories and user locations corresponding to said old security category in said first table;

identifying data elements which include an associated security category corresponding to said old security category in said first table; and replacing the identified security category occurrences associated with said identified data elements with the corresponding new security category from said second table; and wherein said access preventing step comprises the step of preventing the access requesting user from accessing the requested data elements based upon the replaced new security categories associated with said data elements.

11. The method of claim 7 wherein each status value represents one of a series of computer automated design and manufacturing steps.

12. The method of claim 7 wherein each status value represents a step for designing revising and approving an engineering change order.

13. The method of claim 7 wherein said access preventing step comprises one of preventing reading, preventing writing and preventing both reading and writing of the requested data element by the requesting user.

14. A data security control system for data elements which represent an industrial process and which are manipulated by a plurality of users on a data processing system, said industrial process comprising a plurality of industrial process steps, said data security control system comprising:

means for assigning predetermined groups of said plurality of users to access predetermined groups of said data elements at predetermined ones of said industrial process steps wherein at least one of said predetermined user groups is associated with a plurality of locations, and wherein selected data elements are associated with each of said locations; and means, responsive to a user request to access a selected data element, for preventing the access requesting user from accessing the requested data element if the access requesting user is not a member of one of said predetermined groups of said users which has been assigned access to a predetermined group of data elements which includes the selected data element, if the industrial process is not at an industrial process step corresponding to said predetermined ones of said industrial process steps or if said selected data element is not associated with the predetermined location.

15. The system of claim 14 wherein said assigning means comprises:

a first table executing on said data processing system, which maps said predetermined groups of users including user location to corresponding security categories;

a second table executing on said data processing system, which maps said plurality of industrial process steps to at least one old security category and to a corresponding at least one new security category and at least one old location and a corresponding at least one new location; and means for accepting operator entry into said first and second tables user groups including user location, industrial process steps, corresponding old and new security categories and corresponding old and new locations.

16. The system of claim 15 further comprising:

means for accepting an indication that said industrial process has progressed from a first industrial process step to a second industrial process step;

means, responsive to said indication accepting means, for identifying from said second table, old security categories and new security categories and old locations and new locations corresponding to said second industrial process step, for identifying occurrences of security categories and user locations corresponding to said old security category in said first table and for identifying data elements which include an associated security category corresponding to said old security category in said first table; and means, responsive to said identifying means, for replacing the identified security category occurrences associated with said identified data elements with the corresponding new security category from said second table; and wherein said access preventing means comprises means for preventing the access requesting user from accessing the requested data elements based upon the replaced new security categories associated with said data elements.

* * * * *